United States Patent [19]
Turner

[11] 3,932,310
[45] *Jan. 13, 1976

[54] REDUCTION FIRING OF CERAMICS COMPOSITED WITH ORGANIC BINDERS

[75] Inventor: Gordon James Turner, Baltimore, Md.

[73] Assignee: W. R. Grace & Co., New York, N.Y.

[ * ] Notice: The portion of the term of this patent subsequent to Oct. 8, 1991, has been disclaimed.

[22] Filed: Mar. 7, 1974

[21] Appl. No.: 449,113

[52] U.S. Cl............ 252/455 R; 252/477 R; 106/41
[51] Int. Cl.². B01J 29/06; B01J 35/00; C04B 21/06
[58] Field of Search............ 252/477 R, 455 R, 463, 252/424; 423/600, 630, 625; 106/41

[56] References Cited
UNITED STATES PATENTS

| | | | |
|---|---|---|---|
| 2,360,929 | 10/1944 | Blaha.................................. | 106/41 |
| 2,987,411 | 6/1961 | Minnick............................... | 106/41 |
| 3,526,602 | 9/1970 | Kobayashi et al.................. | 252/463 |
| 3,530,209 | 9/1970 | Ho....................................... | 65/33 |
| 3,694,379 | 9/1972 | Yamaguchi et al................. | 423/600 |
| 3,755,204 | 8/1973 | Sergeys.............................. | 252/455 R |
| 3,763,294 | 10/1973 | Nicastro.............................. | 65/33 |
| 3,791,992 | 2/1974 | Feldwick............................. | 423/600 |
| R27,926 | 2/1974 | Roth.................................... | 252/463 |

*Primary Examiner*—Winston A. Douglas
*Assistant Examiner*—William G. Wright
*Attorney, Agent, or Firm*—Joseph P. Nigon, Esq.

[57] ABSTRACT

The invention disclosed is for a process of preparing sintered ceramic structures, which includes heating a green ceramic body formed of a sinterable ceramic moiety composited with a heat decomposable combustible organic binder to decompose at least a substantial portion of the organic binder, the decomposition being effected at a temperature below the sintering temperature of the ceramic moiety, the heating being effected while the body is within a zone sufficiently low in free oxygen concentration to substantially prevent flame propagation at the surface of the ceramic moiety; and thereafter heating to sinter the ceramic moiety to form a sintered ceramic structure.

3 Claims, 3 Drawing Figures

3,932,310

REDUCTION FIRING OF CERAMICS COMPOSITED WITH ORGANIC BINDERS

FIELD OF THE INVENTION

The present invention relates to a process for preparing sintered ceramic structures from green ceramic bodies containing sinterable ceramics composited with heat decomposable organic binders. The process includes a step of heating the bodies in a heating zone to decompose the binders while maintaining the zone sufficiently low in free oxygen concentration to substantially prevent flame propagation from the bodies.

BACKGROUND OF THE INVENTION

It is known that sintered ceramic structures can be prepared by firing aggregates of sinterable ceramic particles to above the sintering temperature. It is also known that firing can be effected by heating green ceramic bodies in a two stage sequence characterized in that the bodies are fired to a suitable first temperature below the sintering temperature under oxidizing flame conditions and thereafter fired to a higher temperature of not less than the sintering temperature under reducing flame conditions.

The prior art firing methods have not been entirely satisfactory for preparation of sintered ceramic structures from sinterable ceramics composited with organic binders which decompose at temperatures less than the sintering temperature of the ceramics. For example, attempted preparation of sintered ceramic structures from sinterable ceramics thus composited using prior art methods result with unacceptable frequency in ceramic structures which are fissured, distorted or otherwise defective.

The applicant herein has found that low quality ceramic structures result where flame propagation occurs on green bodies containing sinterable ceramics composited with combustible organic binders. Such flame propagation typically occurs in the presence of free oxygen during periods of firing at relatively low temperature prior to removal of the binder.

Evidence that at least one other worker recognized that severe problems in preparing ceramic structures from compositions including ceramic powder and thermoplastic binders are encountered in early stages of firing appears in U.S. Pat. No. Re. 28,195 to Sergeys. That patent discloses a method for preparing porous ceramic structures by shaping a ceramic filled particular polyolefin material containing a plasticizer, extracting the plasticizer, burning-off the polyolefin and firing the porous shaped ceramic structure. Thus, as taught in Example 1 thereof, a high molecular weight polyethylene of 0 Melt Index is burnt off by heating in an oxidizing atmosphere in the course of preparing porous ceramic structures. Although the method described in the aforesaid Sergeys patent effectively advanced the art, a need for even further improvement in order to minimize problems such as cracking and distortion has become apparent.

BRIEF DESCRIPTION OF THE INVENTION

Unexpectedly, it has now been found that sintered ceramic structures can be prepared by heating a green ceramic body formed of a sinterable ceramic moiety composited with a heat decomposable combustible organic binder to decompose at least a substantial portion of the organic binder, the decomposition being effected at a temperature below the sintering temperature of the ceramic moiety, the heating being effected while the body is within a zone sufficiently low in free oxygen concentration to substantially prevent flame propagation at the surface of the ceramic moiety; and thereafter heating to sinter the ceramic moiety to form a sintered ceramic structure.

High quality sintered ceramic structures may thus be prepared by:

a. providing a heating zone about a green ceramic body formed of a sinterable ceramic component composited with a heat decomposable organic binder to decompose at least a substantial portion of the organic binder;

b. heating the body to decompose at least a substantial portion of the binder, the decomposition being effected at a temperature below the sintering temperature of the ceramic component;

c. while the body is being heated to effect decomposition of the binder, maintaining the heating zone sufficiently low in free oxygen concentration to substantially prevent flame propagation from the green ceramic body; and thereafter, d. heating the ceramic component to a temperature of at least the sintering temperature thereof. Sintered ceramic structures thus prepared are typically characterized with freedom from fissures and good correspondence in size and shape to the overall dimensions of the ceramic green bodies.

BRIEF DESCRIPTION OF THE DRAWING

In the drawing wherein like numerals refer to similar elements throughout.

DETAILED DESCRIPTION OF THE INVENTION

Figure 1:
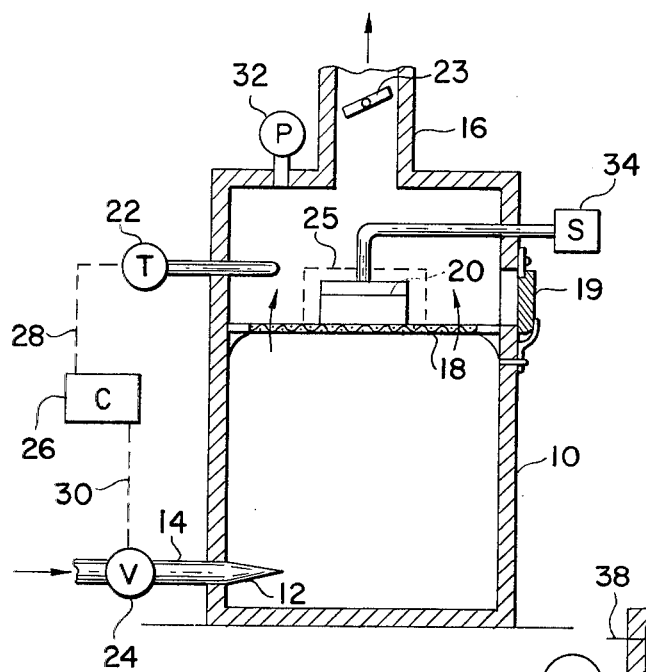
FIG. 1 illustrates an arrangement including a gas-fired kiln for preparing a sintered ceramic structure in accordance with an embodiment of the present invention.

The first step in the process of this invention is providing a heating zone about a green ceramic body formed of a sinterable ceramic component composited with a heat decomposable organic binder. The heating zone may include any suitable heating medium from which, when the media is at a temperature above the temperature of a ceramic green body within the zone, heat will transfer to the body.

It is critical that the heating zone be adapted so that the zone is sufficiently low in free oxygen concentration to substantially prevent flame propagation from the green ceramic body within the zone during heat-effected decomposition of the organic binder component. It is found that if decomposition of the binder contained in the body is effected with free oxygen present in an amount sufficient to result in propagation of flame from the body, the attempted preparation of sintered ceramic structures results with unacceptably high frequency in poor quality structures.

A suitable heating zone includes, as the heating medium, a gaseous mixture resulting from the combustion of a flammable mixture including, as essential ingredients, a gaseous fuel containing chemically combined carbon and free oxygen, the latter ingredient being present in an amount insufficient for complete combustion of the carbon in the fuel to carbon dioxide. Air is a convenient source of free oxygen for practice of the present invention. Suitable fuels include methane, saturated and unsaturated hydrocarbons containing 2 to about 4 carbon atoms, city gas, natural gas, mixtures thereof and the like. While the composition of city or manufactured gas is not fixed, it principally includes carbon monoxide and hydrogen, generally in approximately equimolar amounts thereof. Although the composition of natural gas depends on the source, it principally includes substantial amounts of methane and ethane.

Another suitable heating zone is a gas shield including a relatively dense finely divided packing composition disposed about a ceramic green body from which a sintered ceramic structure may be prepared in the present process. The packing composition is suitably packed about the body so as to essentially prevent flame propagation from the body, and may be supplemented in this function by providing a casing of refractory or other suitable material about a portion of the body not having the packing thereabout.

An especially effective packing composition includes a mixture of a ceramic component and heat decomposable organic component which decomposes at a temperature of less than the sintering temperature of the green body ceramic component. In use, this packing composition is preferably shielded from gaseous environments containing free oxygen, as by having a refractory casing disposed about the outer surface of the packing.

Another suitable heating zone is an inert atmosphere of gas or gaseous mixture which may be gaseous nitrogen, argon, xenon, krypton, and gaseous mixtures thereof.

While the ceramic green body is within the heating zone, the body is heated to decompose at least a substantial portion of the organic binder, the green body having been formulated of a composition including an organic binder component which decomposes at a temperature below the sintering temperature of the included ceramic component. In general, organic binders suitable herein decompose within a temperature range of from about 200°C to about 800°C but binders which decompose either below 200°C or above 800°C may be used.

The organic binder component of the body may be almost any heat decomposable organic binder which decomposes at a temperature of less than the sintering temperature of the ceramic. Preferably, the organic binder is an organic polymer the backbone of which consists essentially of carbon atoms. Suitable organic binders include the poly ($C_2$ to $C_4$ olefins), e.g., polyethylene, polypropylene, copolymers of ethylene and butylene, and mixtures thereof.

In general, the ceramic component included in the composition of which the green body is formed sinters in the temperature range from about 1000°C to about 1600°C. However ceramics which sinter either below 1000°C or above 1600°C may be used. Suitable ceramic components include alumina, magnesium aluminate spinel, spodumene, petalite, mullite, zircon mullite, cordierite, precursors thereof, and mixtures thereof.

Typically, the products of the binder decomposition escape from the green body during the heating step which effects the decomposition. Thus, for example, where the binder is a polyolefin, the decomposition products principally include lower carbon compounds such as alkenes and alkanes having from about 2 to about 4 carbon atoms or more. At the elevated temperatures at which polyolefin decomposition is effected the decomposition products may be found to be gaseous lower molecular weight entities which are removed from the body by the pressure generated upon their formation.

Any suitable ceramic green body may be used in preparing sintered ceramic structures by the present process. The green bodies may include pores or micropores and may include holes therethrough. Suitable porous green ceramic bodies and methods for their preparation are disclosed in the above cited U.S. Pat. No. Re. 28,195. Briefly, as described therein, ceramic green bodies, i.e., bodies which ordinarily have not been fired, may be prepared for example, by mixing a ceramic powder component with a high molecular weight polyolefin binder component and a plasticizer component, shaping the resulting mixture, and preferably extracting at least a substantial portion of the plasticizer.

In a preferred aspect of this invention, a sintered ceramic structure is prepared from a green ceramic body which includes a plurality of through holes defined by body walls of from about 0.1 mil to about 250 mils in thickness. The resulting sintered ceramic structure is typically characterized with through holes of like dimensions and is an excellent monolithic support component for automobile exhaust gas conversion catalysts.

In another preferred aspect, a sintered ceramic structure is prepared from a microporous green ceramic body prepared by extracting at least a substantial portion of a plasticizer from a shaped composition comprising from about 5 to about 20 percent by weight of a polyolefin having weight average molecular weight of at least 150,000 and a standard load melt index of substantially zero, from about 30 to about 85 percent by weight of a sinterable particulate ceramic, and from about 10 to about 50 percent by weight of the plasticizer, the amounts being per 100 parts by total weight of the plasticizer, polyolefin, and ceramic. In this preferred aspect, the green ceramic body may be further characterized with through holes as previously described. The product is a superior monolithic support component for automobile exhaust gas conversion catalysts.

Practice of the present invention will become more fully apparent from the following detailed description taken with the accompanying drawing.

In a preferred embodiment of this invention, the process is carried out in a gas fired furnace as more fully described below with reference to FIG. 1. Therein shown is kiln 10 equipped with burner nozzle 12 which communicates through conduit 14 having valve 24 therein with a source of a rich mixture of air and a suitable gaseous chemically combined carbon containing fuel, which may be natural gas. The kiln or furnace is further provided with outlet 16, work piece support 18, door 19, and may be provided, as shown, with thermocouple 22, draft gauge 32, and gas sampler 34.

Initially, the furnace cavity may be filled with air at a relatively low temperature, e.g., 25°–50°C, below the combustion temperature of the organic binder contained in ceramic green body 20 shown in supported position on the support. The gas rich fuel mixture may next be released in continuous flow to the burner and ignited at the burner outlet to provide a reducing flame with resulting release of heat shown by increase in temperature of the kiln gas, which is continuously removed through the outlet conduit. As combustion of the fuel is continued, the combustion products mix to some extent with air initially in the kiln, thereby diluting the air to a corresponding extent. However, the principal flow of the combustion products of the fuel results in early displacement of air from the kiln through the outlet. Pivotable plate 23 or other suitable flow regulating means is provided in the outlet, thus permitting operation of the kiln under a positive pressure sufficient to essentially prevent entry of air other than the air included in the rich fuel mixture.

Before the kiln gas temperature increases to the ignition temperature of the binder contained in the green body, a heating zone is established about the body, as indicated by line 25. The heating zone is thus found to include a heating medium consisting essentially of the hot combustion products of the fuel-air mixture and includes a sufficiently low concentration of free oxygen to essentially prevent flame propagation from the green body as would occur at higher free-oxygen concentrations permitting burning of the binder.

Heating is continued with the reducing flame at a suitable rate, e.g., from about 100°C per hour to about 300°C per hour or more, until the binder decomposition temperature has been reached and maintained or exceeded for sufficient time to complete the decomposition. The rate of temperature increase may be controlled at any suitable rate by increasing the rate of flow of the fuel-air mixture to the burner. If desired, the temperature rise rate may be automatically controlled by way of control unit 26 which can be adapted by well known techniques to regulate valve 24 by output signal 30 in controlled response to an input signal received from the thermocouple through input signal line 28.

After binder decomposition is complete, heating is continued to increase the temperature to or above the sintering temperature of the ceramic component and a higher temperature is maintained until sintering is effected.

The heating after the binder is decomposed may be carried out using any suitable heating condition. As a general preference, this heating is carried out using an oxidizing flame, that is, a flame resulting from combustion of a fuel-air mixture containing more air than the stoichiometric or theoretical amount required for complete combustion of the carbon moieties in the fuel to carbon dioxide. Almost any excess of air above the stoichiometric amount may be used in the sintering stage. A natural gas-air mixture containing about 30 percent excess air has been found to be highly suitable.

After sintering, the sintered ceramic may be cooled and recovered.

Completion of binder decomposition may be determined by analyzing the kiln gas. Typically, analysis of samples of the kiln gas taken slightly above the green body indicate that when decomposition begins the percentage of the combustible matter increases above the percent excess of fuel above the stoichiometric amount which the air supplied will completely convert to carbon dioxide. These analyses further indicate that the amount of combustible matter increases to a maximum value, e.g., 8 to 10 percent, and subsequently decreases. Substantial completion of decomposition is indicated by essentially constant combustible content measurements for successive samples taken about 10 minutes apart after the above mentioned decrease occurs.

Figure 2:
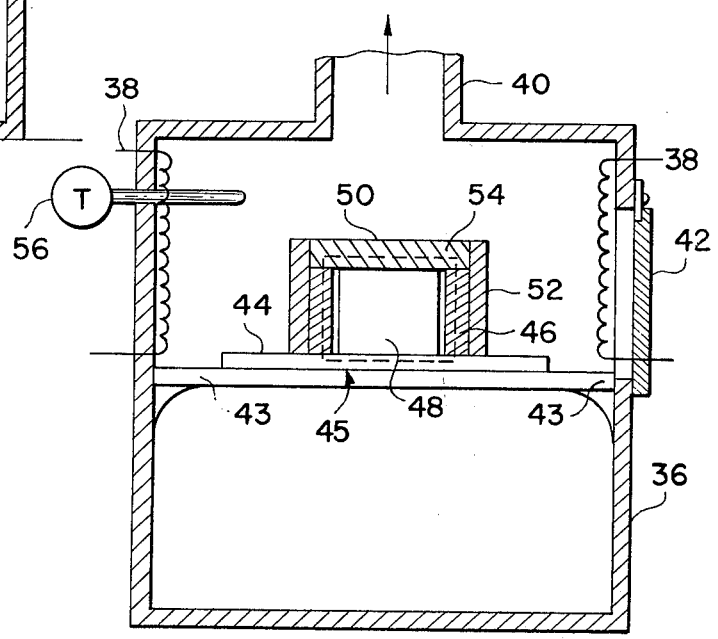
FIG. 2 illustrates an arrangement including a saggered ceramic unit in an electric kiln for practicing the present invention in accordance with another embodiment thereof.
Figure 3:
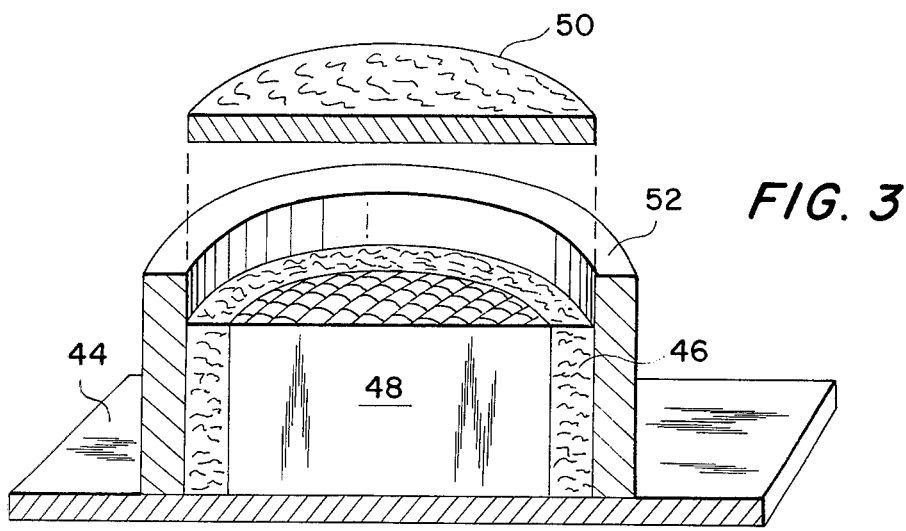
FIG. 3 illustrates in greater detail the saggered ceramic unit shown in FIG. 2.

In another preferred embodiment of this invention, the process is carried out in an electric kiln as more fully described below with reference to FIG. 2 and FIG. 3. Referring now to FIG. 2 there is shown furnace 36 equipped with electric heating element 38 powered by a conventional power source (not shown). The furnace or kiln is provided with outlet 40, pivotable door 42, thermocouple 56 and hearth plate 43. Supported by the hearth plate is assembly 45 (shown in greater detail in exploded perspective view, partly in section, in FIG. 3). The assembly includes relatively rigid support 44, which may be of heat conductive ceramic material, ceramic green body 48, which may be cylindrical as shown, atop the support and packing 46 of relatively dense finely divided composition, preferably of a mixture including a ceramic powder component and a heat decomposable organic binder component which decomposes at a temperature of less than the sintering temperature of the ceramic component of the green body, the packing being disposed about the surface of the green body. The packing extends essentially from the body to the inner surface of ring shaped sagger 52 which may be of alumina or other suitable refractory material. The assembly further includes cover 50 which may be a ceramic wool batt. Preferably, all members of the assembly are of good thermal conductivity. The heating zone is illustrated by line 54.

The cavity of the kiln may contain air or other suitable heat transfer medium. The assembly effectively precludes entry of air into the heating zone.

Decomposition of the binder component of the organic body with essentially no flame propagation from the ceramic green body is effected by energizing the electric heating element, preferably at a suitable rate to increase the kiln gas temperature at a rate of from about 100°C per hour to about 300°C per hour or more. Typically, in this embodiment, flame is propagated from the juncture of the outer surface of the ceramic wool batt and the sagger, indicating that the binders of the packing and of the body are decomposed into combustible decomposition products which are released to the assembly surface where combustion thereof occurs, this action serving to substantially preclude entry of air to within the heating zone to substantially preclude propagation of flame from the green body as decomposition is effected.

After binder decomposition and sintering are effected, the resulting sintered ceramic structure may be recovered from the kiln.

In another embodiment, the assembly may include a support having a green body disposed thereon and a ceramic-binder packing composition essentially entirely about the portions of the body surface not in contact with the support.

Practice of the present invention is further illustrated by the following specific but non-limiting examples. All parts and percentages given throughout this description are by weight unless otherwise indicated.

EXAMPLE 1

150 1-pound green ceramic bodies, each containing about 0.9 pound of a finely divided cordierite precursor composition (75 percent kaolin and 25 percent talc) and about 0.1 pound of polyethylene having a weight average molecular weight of about 160,000 to 250,000 and a standard load melt index of 0, were prepared by the method of the above cited U.S. Pat. No. Re. 28,195, and incorporated herein by reference as set out in Example 1 thereof through the post-extraction drying step, except that the above described cordierite precursor composition was substituted for the alumina of that example.

The green ceramic bodies were placed while at about 25°C on a work piece support in a 14 cubic foot shuttle kiln equipped with a thermocouple, pressure gauge, gas sampler, and burners connected to a mixing nozzle in flow communication with a supply of natural gas fuel and air. The fuel and air flows were adjusted to provide a flammable fuel-air mixture containing 0.5 to 10 volume or mole percent excess fuel, the excess being expressed relative to the theoretical, i.e., stoichiometric, amount required for complete combustion reaction of fuel and air to carbon dioxide and water. The flowing fuel-air mixture was ignited at the burner, producing a reducing flame, heat and an "oxygen deficient" atmosphere in the kiln. The kiln was operated under a positive gauge pressure of 0.1 inch of water (i.e., approximately 760.2 mm Hg absolute pressure), thus essentially precluding entry of air other than the air in the flammable fuel-air mixture. The slight positive pressure was maintained by regulation of available flow area in the exhaust duct provided atop the kiln.

The temperature of the kiln gas was increased at a substantially constant rate of 250°C per hour by generally steadily increasing the total flow of the rich fuel-air mixture to the burner. At spaced time intervals during the period of heating with the reducing flame, samples of the gas above the green ceramic bodies were withdrawn. Gas analyses made using known procedures therefor showed that the content of combustible matter gradually increased to a maxium of about 9.5 volume percent expressed as excess above the theoretical or stoichiometric amount for complete combustion of the added natural gas fuel. This maximum occured at 600°C. The analyses showed that the kiln gas samples during this period included lower molecular weight hydrocarbons having from 1 or 2 to about 25 carbon atoms as results from pyrolytic decomposition of polyethylene and essentially no free oxygen. Analysis of a gas sample withdrawn when the temperature of the kiln gas was 800°C showed that combustible matter was present in an amount corresponding to 4.5 percent excess relative to the stoichiometric amount for complete combustion.

Observations of the ceramic green bodies made frequently throughout the 3.5 hour period of heating to 800°C showed essentially no flame propagation on the bodies.

The data shows that the hydrocarbon content of the gas samples increased and thereafter decreased in a manner corresponding to the time variation of the combustible matter content.

The analysis of the kiln gas above the green bodies when the temperature reached 800°C evidenced that decomposition and removal of the polyethylene binder was complete at least by the end of the period of heating to that temperature.

After withdrawing the sample when the kiln gas temperature reached 800°C, the composition of the fuel-air mixture supplied to the burner was adjusted to 30 percent excess air resulting in further heating, now by an oxidizing flame. Firing of the green ceramic bodies was continued in the oxidizing mode at a temperature rise rate of 100°C per hour until the temperature of the kiln gas was 1400°C, which temperature was maintained for about 2 hours, followed by cooling to about 100°C.

After cooling, the resulting sintered ceramic structures were removed from the kiln. Observations showed that all the structures were crack-free, rigid and of substantially the same overall size and shape as the corresponding green bodies from which they were prepared.

EXAMPLE 2

The heating procedure of Example 1 was repeated using green bodies prepared as described therein except that the kiln was operated under a pressure of 0.01 to 0.1 inch of water less than the atmosphere surrounding the kiln. Air other than the air in the controlled fuel-air mixture supplied to the burner essentially continuously leaked into the kiln. Gas samples taken during the period of reducing flame operation showed the presence of free oxygen in the region adjacent the green bodies.

Many of the recovered ceramic structures were found to be crushed, cracked, exfoliated and otherwise distorted.

EXAMPLE 3

A number of green ceramic bodies containing 7 to 10 percent organic binder and prepared substantially as set forth in the first paragraph of Example 1 hereof were placed on a ceramic support. About each individual body was placed a ring shaped alumina sagger slightly greater in length than the height of the body and the intervening annular space was packed with a free flowing burial powder consisting of finely divided ceramic having up to about 10 percent poly ($C_2$ to $C_4$ olefin) dispersed throughout. The arrangements were each capped with closely fitting ceramic wool batts to provide sagger units substantially as illustrated in FIG. 2 of the appended drawing. The green bodies in thus assembled form were supported in a kiln equipped with an electric heating element.

The heating element was activated and the power supplied was increased at a rate providing a kiln temperature rise rate of 300°F (about 170°C) per hour to a temperature of 1800°F (about 1000°C). Flames were observed to propagate from atop the sagger units, emanating essentially at the junctures of the tops of the annular alumina saggers and the tops of the cylindrical disc shaped ceramic wool batts. These flames were observed throughout the time period starting essentially at the time at which the kiln temperature was about 250°C and ending essentially at the time at which the kiln temperature was about 700°C. These observations indicated that a highly concentrated source of gaseous fuel was generated within the sagger units by pyrolitic decomposition of the organic binder contained in the green bodies and similarly constituted packing.

The ceramic green bodies were fired by continuing to heat the kiln at a temperature rise rate of 100°F per hour through the temperature range from 1800°F to 2500°F and maintaining the latter temperature for 2 to 3 hours. After cooling the furnace to 400°F the resulting sintered ceramic bodies were recovered and observed to be of excellent quality, including freedom from cracks, exfoliation and distortion. There was no evidence that flame propagated from the bodies during the heating procedure.

EXAMPLE 4

Example 3 was repeated except that the burial powder was omitted. Flames were observed to propagate from the green ceramic bodies during the time interval corresponding to the temperature range of about 250°C to about 700°C.

Upon recovery, observations showed that the resulting sintered ceramic bodies were cracked and distorted.

It is understood that the foregoing detailed description is given merely by way of illustration and that numerous variations may be made therein without departing from the spirit or scope of this invention.

What is claimed is:

1. In a process for preparing a porous ceramic structures by:
    a. mixing a ceramic powder component with a high molecular weight polyolefin having a molecular weight of about 160,000 to 250,000 and a mineral oil plasticizer,
    b. molding said composition to form a plastic sheet and impressing ribs thereon,
    c. extracting the plasticizer with an organic solvent,
    d. rolling said plastic sheet so that said ribs contact said sheet and fusing the contacting areas together thermoplastically, the improvement comprising,
    1. increasing the temperature of the body at a rate of about 100° to 300°C. per hour until a temperature of about 800°C. is reached, in fuel air mixture containing 0.5 to 10 volume percent excess fuel over the stoichiometric amount required for combustion, to burn off the polyolefin and,
    2. increasing the temperature to about 1000°C. to 1600°C. in the presence of about 30% excess of the amount of air required for complete combustion and maintaining the temperature at 1000° to 1600°C. for abut 2 hours to sinter the ceramic component and,
    3. cooling and recovering the porous ceramic structure.

2. The process according to claim 1 wherein the mixture of Step (a) contains about 5 to 20 weight percent of polyolefin having a molecular weight of at least 150,000, 30 to 35 weight percent of a sinterable particulate ceramic and about 10 to 50 weight percent of a mineral oil plasticizer.

3. The process according to claim 2 wherein the ceramic is selected from the group consisting of alumina, spodumene, mullite and cordierite.

* * * * *